United States Patent [19]

Gutmann et al.

[11] 4,215,184

[45] Jul. 29, 1980

[54] NICKEL-OXIDE/HYDROGEN BATTERY CELLS

[75] Inventors: Günter Gutmann, Esslingen; Gabor Benczur-Ürmössy, Stuttgart, both of Fed. Rep. of Germany

[73] Assignee: Firma Deutsche Automobilgesellschaft mbH, Hanover, Fed. Rep. of Germany

[21] Appl. No.: 63,745

[22] Filed: Aug. 6, 1979

[30] Foreign Application Priority Data

Aug. 12, 1978 [DE] Fed. Rep. of Germany ....... 2835503

[51] Int. Cl.² ........................................... H01M 12/06
[52] U.S. Cl. ...................................... 429/101; 429/44; 429/223
[58] Field of Search ...................... 429/101, 44, 42, 40, 429/27, 34, 223

[56] References Cited

U.S. PATENT DOCUMENTS

| | | | |
|---|---|---|---|
| 3,867,199 | 2/1975 | Dunlop et al. | 429/101 |
| 4,117,206 | 9/1978 | Plust et al. | 429/101 |
| 4,127,703 | 11/1978 | Holleck | 429/101 X |
| 4,159,367 | 6/1979 | Berchielli et al. | 429/101 X |

*Primary Examiner*—Anthony Skapars
*Attorney, Agent, or Firm*—Browdy and Neimark

[57] ABSTRACT

The heat transfer in a nickel-oxide/hydrogen battery cell is substantially improved by increasing the thermal conductivity in the axial direction of the electrode stack. This improvement in thermal conductivity is due principally to the construction of the negative electrode containing catalyst as an integral part of the gas diffusion element, thus reducing the number of components in an electrode unit of the battery stack from six to four.

10 Claims, 2 Drawing Figures

NICKEL-OXIDE/HYDROGEN BATTERY CELLS

FIELD OF THE INVENTION

The invention relates broadly to electric storage batteries. More particularly, the invention relates to nickel-oxide/hydrogen cells having positive nickel-oxide storage electrodes and negative electrodes consuming or producing hydrogen, the negative electrodes containing a Raney nickel catalyst.

BACKGROUND OF THE INVENTION

The very favorable operational properties of nickel/hydrogen cells with positive nickel-oxide electrodes and negative hydrogen catalyst electrodes have attracted considerable attention in recent years. However, the practical application of this battery has been limited to its use as a storage battery in earth satellites. A broader use of this type of battery has generally been impeded by its high cost which is due to the use of negative fuel cell electrodes which contain noble metals, the use of conventional but expensive sintered nickel electrodes and the necessity for a pressure housing which is relatively expensive compared to normal battery cases. The overall state-of-the art in this technology is known for example from the publication "Power Sources 6" by D. H. Collins, editor, Academic Press London, New York, San Francisco 1977, pages 231 ff and 249 ff.

In order to broaden the field of application for nickel/hydrogen batteries, it has been proposed to employ positive nickel-oxide electrodes of large capacity per unit area (approximately 100 mAh/$cm^2$) in combination with hydrophilic negative electrodes and associated with suitable adaptation of capillary forces or pore size distribution in electrolytically linked components. The common disposition of the components of an electrode stack of this type is shown in FIG. 1. For convenience and to facilitate understanding, a single stacking unit "n" is shown in the drawing. In the system illustrated there, two end plates 22 surround polypropylene gas diffusion screens 23 which lie in contact with negative hydrogen electrodes 25 which are separated by separators 26 from a central positive nickel-oxide electrode.

With the use of positive electrodes of higher capacity per unit area than conventional sintered nickel electrodes which have the capacity of only approximately 35 mAh/$cm^2$, the current density is increased for identical discharge times. The large power capability of the positive and negative electrodes prevents any substantial power loss for discharges not exceeding the one-half hour rate while resulting in substantial cost saving due to the reduction of the number of electrodes. However, when the negative electrodes contain platinum, the cost of a battery cell of this type is still too high for many common applications.

OBJECT AND SUMMARY OF THE INVENTION

It is thus a principal object of the present invention to provide a nickel-oxide/hydrogen battery cell whose operational characteristics and costs of production are such as to permit its use in a substantially larger number of applications than heretofore possible, and especially for electric propulsion.

These and other objects are attained according to the invention by providing a battery cell in which the number of elements in the electrode stack is reduced with respect to the prior art by structural integration of the negative electrodes in the diffusion element.

Accordingly, the invention provides a gas diffusion element which has metallic electric conductivity, low weight and presents relatively low flow resistance with respect to the reaction gas. It has been found suitable to use, for example, fibrous nickel substrates. These nickel substrates contain powdered catalyst, preferably Raney nickel, in stabilized non-pyrophoric form of suitable grain size and structure. The catalyst may be fixated and/or made hydrophobic. The Raney nickel or the nickel/aluminum starting alloy which serves to form Raney nickel may be introduced in powdered form, suitably together with up to 50% of powdered nickel in a metallized fibrous substrate which can consist of nickel-coated or copper-coated carbon or other organic fibers in such a way that the electrode exhibits a lateral or central region which is substantially free of Raney nickel catalyst. An electrode of this type is described in a concurrent patent application of the Applicant. The electrode substrate may also consist however of nickel or copper-coated metal fibers or of iron, steel, copper or nickel fibers. The introduction of the catalyst powder may take place by vibratory filling, by filtration from a suspension or by the application of a paste. The powder may be fixated by the addition of a binder and may subsequently be nickel-plated in galvanic or electroless manner. Additives may be employed to render the electrode hydrophobic. The metal powder mixture can also be activated, for example by the addition of palladium or the like.

Other features and advantages of the invention will emerge from the description of a preferred exemplary embodiment relating to the drawing.

DESCRIPTION OF THE PREFERRED EMBODIMENT

Figure 1:
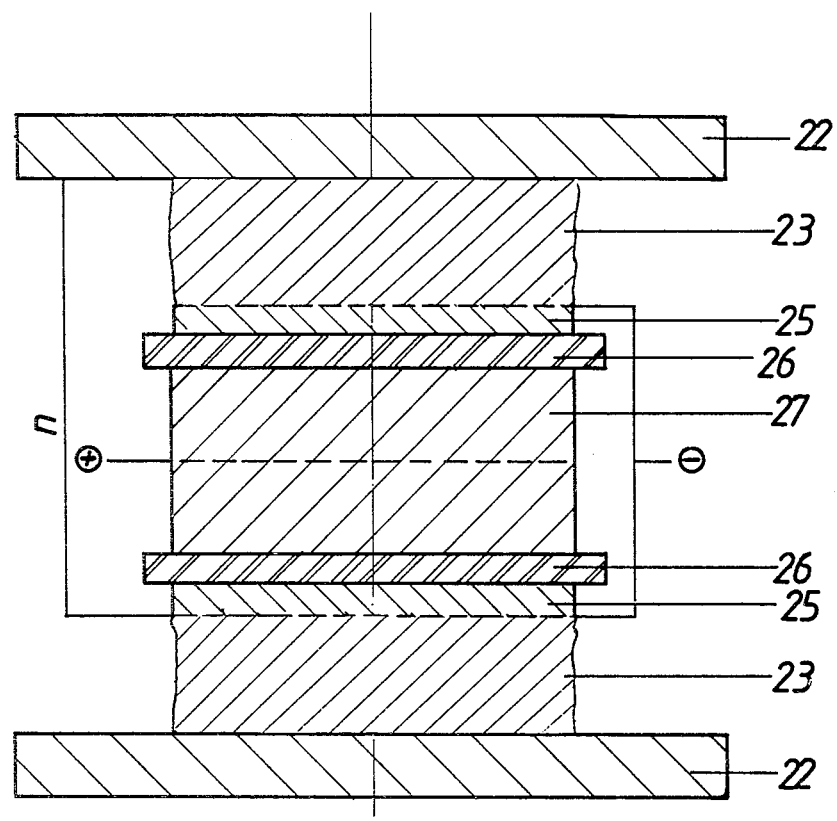
FIG. 1 is a schematic section of an electrode stack of a nickel-oxide/hydrogen battery known in the prior art.
Figure 1:
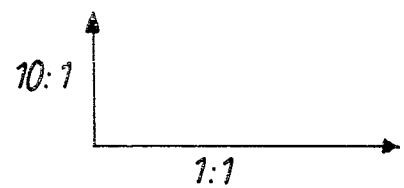
Figure 2:
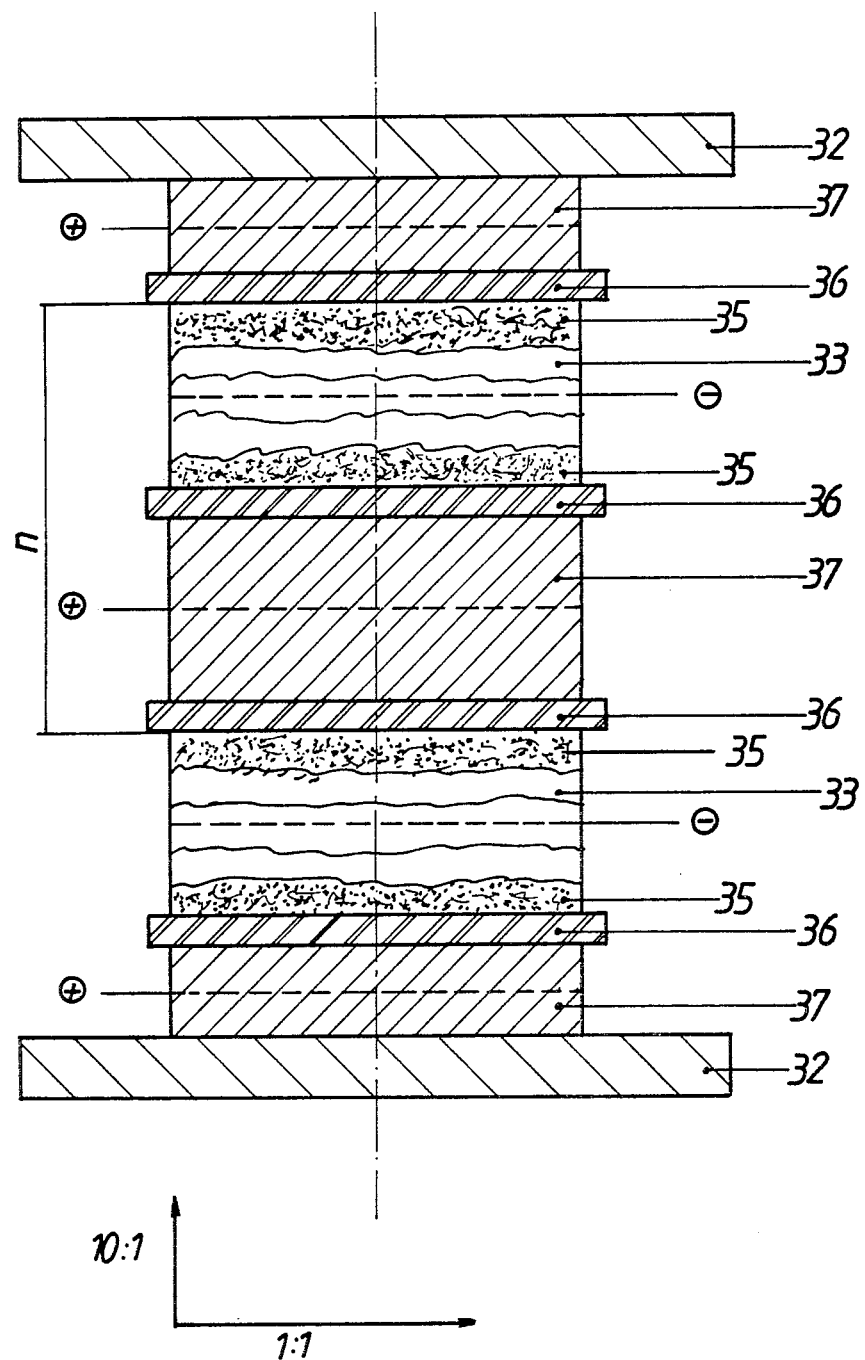
FIG. 2 is a schematic section of an electrode stack of a nickel-oxide/hydrogen battery according to the invention.

The preferred exemplary embodiment of the invention illustrated in FIG. 2 includes two end plates 32 disposed at respective ends of a stack of components disposed symmetrically with respect to the central axis and including, in succession, a positive electrode 37, a separator 36, an integrated catalyst layer 35, a gas diffusion element 33, another integrated catalyst layer 35, a further separator 36 and again a positive electrode 37. Within the electrode stack, each stacking unit has only four elements. This number is to be contrasted with the six elements contained in the stacking unit of the prior art cell stack illustrated in FIG. 1. In both cases, the stacking unit is designated by the letter "n", with a sequence of such electrode units "n" forming the cell stack.

The construction of the electrode stack with the diffusion elements according to the present invention, i.e., with integrated negative electrodes, has a number of substantial advantages. Among these is that the thermal conductivity in the axial direction of the stack is improved by nearly an order of magnitude with the use of metal fiber substrates in the construction according to the present invention when compared with customary plastic diffusion elements. This fact becomes significant because the thermodynamic efficiency of nickel-oxide/hydrogen cells is only about 86% as compared with approximately 90% in nickel-oxide/cadmium cells. For this reason, nickel-oxide/hydrogen cells heat up to a greater degree than other alkaline batteries on discharge. Such heating may lead to irreversible losses of capacity of the cell for example if an individual cell having more than approximately 40 Wh of capacity is discharged in an hour or less. Due to the improved thermal conductivity, the heat will be conducted out of the cell substantially more effectively.

Another advantage of the construction according to the invention is that the cross-sectional dimensions of the positive and negative electrode leads or tabs may be the same because the ratio of the number of positive electrodes to the negative electrodes is very nearly 1 (unity) in stacks consisting of several stacking units.

The electrode stack of the invention has somewhat less elasticity than is the case in conventional constructions. Therefore it is advantageous to include elastic elements which lie adjacent to the end plates of the electrode stack. These elements may be, for example, spring elements. However, it is also possible to use, for example, a compressible foam element, for example plates or strips of felt or some other compressible material, disposed between the housing of the cell and the end plates or between the electrode stack and the end plates and intended to absorb changes in volume.

The battery cell according to the invention will now be described on the basis of two specific exemplary constructions which are given to illustrate the functional capacity and various advantages of the invention.

EXAMPLE 1

A carbon felt of a thickness of 5 mm and coated with 0.40 g/cm$^3$ of nickel, a porosity of 90% and a diameter of 6.2 cm consists of five layers in which the orientation of the fibers is basically parallel. However, the direction of the fibers in the second and fourth layer is rotated by 90° with respect to the other layers. This metallized felt is inserted in a powder bed containing Raney nickel powder (Degussa Type 213, stabilized, main grain fraction 0.005–0.015 mm). The powder bed is vibrated electromagnetically at an amplitude of 3 mm at 50 cycles per second for 5 minutes. Subsequently, the electrode is subjected to a preliminary fixation of the powder by means of a solution of 0.2% by weight of polyisobutylene in light gasoline and is thereafter dried. A metallurgical inspection of the electrode shows that the two outer layers of the electrode are filled with powder mixture whereas the three internal layers are practically free of powder. The increase in weight of 3.99 g corresponds to a quantity of catalyst of 69.5 mg/cm$^2$ of working surface. Accordingly, the central zone of the felt lattice constitutes the gas diffusion element, whereas the lateral zones serve as the fibrous substrate of the catalytic electrode and the electrodes are thus integrated in the diffusion element. A nickel foil tab of thickness of 0.2 mm and a width of 1 cm is spot-welded to the electrode.

The electrode element constructed according to the above description is placed as illustrated in FIG. 2 between two asbestos separators of 0.2 mm thickness and between two nickel-oxide electrodes of 4.2 mm thickness. An elastic spring element disposed between each positive electrode and the end plate exerts a pressure of approximately 0.2 bar on the electrode stack.

The quantity of electrolyte in the stack is chosen so that the free pore volume of the positive electrode is filled with electrolyte to approximately 90% and this quantity corresponds to 2.25 ml/Ah of the available capacity. The concentration of electrolyte is chosen equal to 7.6 M KOH. The electrode stack filled with electrolyte is now placed within a thick-walled pressure housing which is equipped with insulated electrical feedthroughs and connections for filling the battery with hydrogen. The battery is also equipped with a manometer. After several flushings with hydrogen, the battery is given a hydrogen precharge of 5 bar and is then cycled.

In the battery described above, the following values of current density vs. battery voltage were obtained at a discharge level of 40%, a pressure of 10.6 bar and a temperature of 38° C.

Table 1

| Current density (mA/cm$^2$) | Cell voltage (volt) |
|---|---|
| 0 | 1.31 |
| 10 | 1.28 |
| 25 | 1.22 |
| 50 | 1.14 |
| 100 | 1.01 |

Table 1:
Current vs. voltage in a nickel/hydrogen cell

These values may be still further improved by improving the structure of the catalytic layer and an adaptation of the quantity of electrolyte to the particular structure as well as by employing a larger reaction surface. However, these data do show the principal functional characteristics of the battery according to the invention. It should be noted that the example described above does not define the invention in the sense of constituting its limitations but is given merely by way of an exemplary illustration subject to various technical modifications.

Various characteristics of the electrode stack according to the invention using a diffusion element with integrated negative electrodes are now given in a second example emphasizing the improved thermal conductivity of the stack according to the invention. The dimensions and weights of the components are so chosen as to permit an immediate comparison between the performance characteristics of the battery stack according to the prior art (stack No. 1) and the battery stack according to the present invention (stack No. 2). These data are tabulated in Table 2.

In stack 1 (prior art), the stack is seen to exhibit a thermal conductivity $\lambda_p = 6.44 \times 10^{-2}$ W/cm·K, in a direction parallel to the components and a value of $\lambda_v = 5.49 \times 10^{-3}$ W/cm·K in a direction perpendicular to the components. In the stack according to the invention (stack 2) $\lambda_p = 6.47 \times 10^{-2}$ W/cm·K and $\lambda_v = 3.91 \times 10^{-2}$ W/cm·K.

Thus, for the cell according to the invention and parallel to the components (i.e., in the radial direction when the customary cylindrical stack construction is used), the thermal conductivity is substantially the same as in the prior art construction, whereas in the direction perpendicular to the components (axial direction), the thermal conductivity is over seven times greater than it is in the stack according to the prior art. This improved axial thermal conductivity results in the desired uniform temperature distribution and improved heat transfer.

Table 2:
Thickness, porosity and thermal conductivity of components in nickel/hydrogen cells

STACK 1

| No. in FIG. 1 | Component | Thickness (cm) | Porosity | Thermal conductivity (W/cm · K) |
|---|---|---|---|---|
| 27 | Positive electrode | 0.42 | 0.55 | $5.0 \cdot 10^{-2}$ |
| 26 | Separator | 0.02 | 0.90 | $5.3 \cdot 10^{-3}$ |
| 25 | Negative electrode: 70 mg Raney-nickel/ $cm^2$ | 0.1 | 0.78 | $2.0 \cdot 10^{-1}$ |
| 23 | Diffusion element: Polypropylene | 0.3 | 0.85 | $1.9 \cdot 10^{-3}$ |

STACK 2

| No. in FIG. 2 | Component | Thickness (cm) | Porosity | Thermal conductivity (W/cm · K) |
|---|---|---|---|---|
| 37 | Positive electrode | 0.42 | 0.55 | $5.0 \cdot 10^{-2}$ |
| 36 | Separator | 0.02 | 0.90 | $5.3 \cdot 10^{-3}$ |
| 33 | Diffusion element (33) | 0.5 | 0.95 | |
| 35 | with integrated negative electrode (35) | $2 \times 0.1$ | 0.84 | |
| 33 | Vertical (axial) | | | $5.8 \cdot 10^{-2}$ |
| 35 | Parallel (radial) | | | $8.1 \cdot 10^{-2}$ |

The invention described above is subject to various changes, modifications and variations within the competence of the person skilled in the art. Among these are, for example, the use of metal felts to which powdered catalyst is applied unsymmetrically, for example having a layer of catalyst in contact with the separator, whereas the diffusion layer free of catalyst makes contact with the gas diffusion layer of the next felt element; the inclusion of a metallically conducting element between the two felt elements; the adjustment of the capillary forces in the negative electrode layer by hydrophobization or a choice of the size of the pores in the working layer; the use of platinum or other additives in the catalytic layer to enhance the activity; the use of copper fiber substrates or felts instead of nickel felts. Such changes are all to be considered within the scope and framework of the invention.

We claim:

1. A nickel-oxide/hydrogen battery cell including a pressure housing, and disposed in said housing a plurality of elements including positive nickel-oxide electrodes, negative hydrogen electrodes containing Raney nickel serving to catalyze hydrogen consumption or production, there being disposed between each two negative electrodes a diffusion element for the transport of hydrogen to and from the negative electrodes, said plurality of elements being configured as a stack in which each positive electrode is adjacent to two negative electrodes and said positive and negative electrodes are separated by separators and wherein the improvement comprises:
said negative electrodes are structurally integral with said diffusion elements and said diffusion elements consist of a metallically conducting substrate and also serve as current collecting support structures for said negative electrodes.

2. A nickel-oxide/hydrogen cell according to claim 1, further comprising a pair of end plates disposed at opposite ends of said stack of elements, and there being still further provided elastic means disposed respectively between an end plate and an adjacent electrochemically active electrode and capable of absorbing axial stresses in said stack.

3. A nickel-oxide/hydrogen cell according to claim 1, wherein said stack is configured symmetrically with respect to the electrochemically active catalytic layer in said diffusion elements having integrated negative electrodes.

4. A nickel-oxide/hydrogen cell according to claim 1, wherein said stack is configured to be non-symmetric with respect to the electrochemically active catalytic layer in said diffusion elements having integrated negative electrodes, and wherein the catalytic layer in the interior of the metallic fiber substrate of said diffusion elements is disposed near a boundary surface of said fiber substrate whereas the boundary surface parallel thereto is free of catalyst.

5. A nickel-oxide/hydrogen cell according to claim 4, wherein said metallically conducting fiber substrate consists of metallic fibers.

6. A nickel-oxide/hydrogen cell according to claim 4, wherein said metallically conducting fiber substrate consists of nickel-coated organic fibers.

7. A nickel-oxide/hydrogen cell according to claim 4, wherein said metallically conducting fiber substrate consists of copper-coated organic fibers.

8. A nickel-oxide/hydrogen cell according to claim 4, wherein said metallically conducting fiber substrate consists of metal-coated inorganic fibers.

9. A nickel-oxide/hydrogen cell according to claim 1, wherein said diffusion elements having integral negative electrodes contain Raney nickel in a concentration of 10–100 mg per square centimeter of active electrode surface.

10. A nickel-oxide/hydrogen cell according to claim 1, wherein said diffusion elements having integral negative electrodes contain Raney nickel in a concentration of 25–70 mg per square centimeter of active electrode surface.

* * * * *